A. J. HATHCOX.
NUT LOCK.
APPLICATION FILED JAN. 11, 1909.

923,264. Patented June 1, 1909.

Witnesses
C. D. B. Brown.
C. H. Griesbauer.

Inventor
A. J. Hathcox,
By H. B. Willson & Co.
Attorneys.

UNITED STATES PATENT OFFICE.

ALVIS JACKSON HATHCOX, OF DURANT, OKLAHOMA.

NUT-LOCK.

No. 923,264.   Specification of Letters Patent.   Patented June 1, 1909.

Application filed January 11, 1909. Serial No. 471,712.

*To all whom it may concern:*

Be it known that I, ALVIS J. HATHCOX, a citizen of the United States, residing at Durant, in the county of Bryan and State of Oklahoma, have invented certain new and useful Improvements in Nut-Locks; and I do declare the following to be a full, clear, and exact description of the invention, such as will enable other skilled in the art to which it appertains to make and use the same.

This invention relates to improvements in nut locks and has for its objects the production of a simple nut lock comprising a longitudinally split bolt and a washer and a nut arranged on the bolt having clutch surfaces, the washer being provided with an overhanging locking arm adapted to enter this split portion of the bolt.

With the foregoing and other objects in view, the invention consists of certain novel features of construction, combination and arrangement of parts, as will be more fully described and particularly pointed out in the appended claim.

Figure 1:
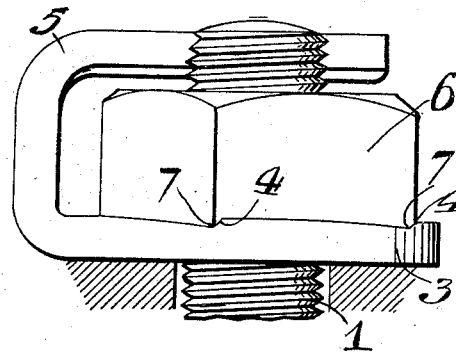
Figure 2:
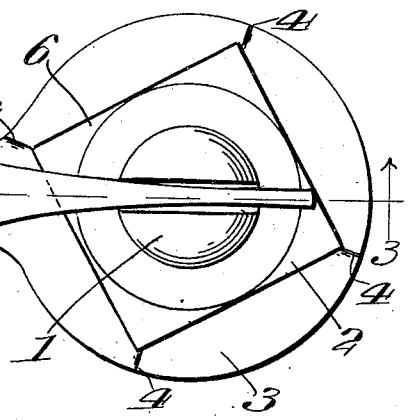
Figure 3:
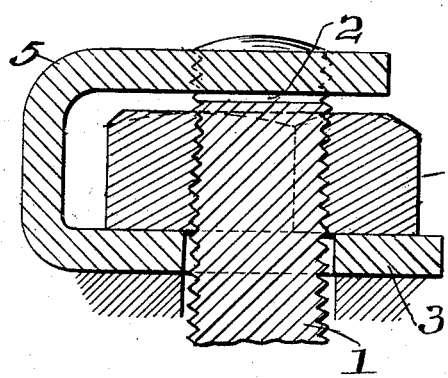
Figure 5:
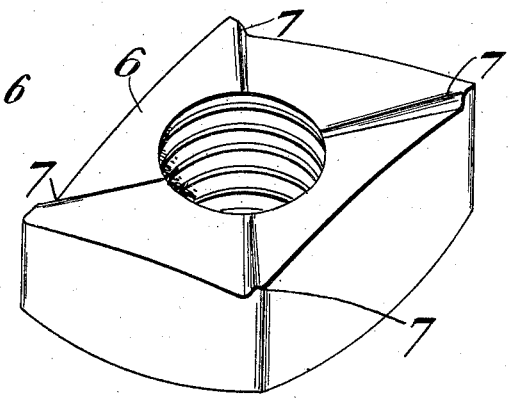
Figure 4:
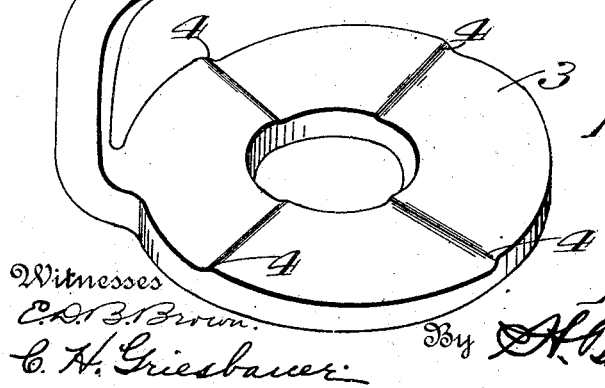

In the accompanying drawings, Figure 1, is a side elevation with the arm of the washer shown in operative position. Fig. 2, is a plan view thereof. Fig. 3, is a longitudinal sectional view taken on line 3—3 of Fig. 2. Fig. 4, is a detail perspective view of the washer, and Fig. 5 is a detail perspective view of the nut.

Referring to the accompanying drawings, 1 designates a bolt which is longitudinally split at 2 on its threaded end so as to receive a locking arm or key. 3 denotes a washer which is formed with a plurality of clutch teeth 4 and with an upstanding locking arm or key 5, which is adapted to be bent over the threaded end of the bolt 1, so as to enter the split end thereof. 6 denotes a nut which is formed with a plurality of clutch teeth 7 adapted to engage with the clutch teeth 4 of the washer 3. The washer 3 is preferably made of malleable iron or other metal and before being applied on the bolt, the locking arm or key 5 is extended in a line substantially parallel with the axis of the bolt. In assembling the lock the washer 3 is first positioned on the bolt 1 and against the material to be clamped, or secured with the locking key in a position at right angles thereto, and the nut 6 threaded on the split end of the bolt with the clutch teeth 7 facing inwardly and forced against the clutch teeth 4 of the washer 3. When the nut 6 has been forced to its innermost position against the washer 3, the outer end of the locking arm or key 5 is bent over the nut 6 and said end forced between the split end of the bolt 1 and hammered against the outer side or face of said nut.

By means of my improvements a nut lock is provided which will withstand severe stress and securely clamp a rail or other device. It will be observed that when the locking arm or key 5 has been forced between the split end of a bolt 1 and against the outer side of the face of the nut 6, said nut will be confined between the outer face of the washer 3 and said arm and the teeth 7 of the nut will be held in positive engagement with the teeth 4 of the washer, so as to permanently confine and hold the nut and the washer on the outer end of the bolt.

In applying my invention the slot of the threaded bolt is preferably formed just deep enough to receive the locking arm or key of the washer, but the depth of the slot will of course be regulated by the condition of the work. The washer arm is formed with a suitable taper so that it may readily enter the bolt slot.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described and ascertained the nature of my invention, what I claim as new and desire to secure by Letters-Patent, is—

A nut lock comprising a bolt having a threaded end split for the reception of a transversely projecting locking key, a washer having clutch teeth arranged on its outer face or surface, and having an outwardly projecting arm or key terminating in a square end, said end being adapted to enter the split end of the bolt, and a nut formed with clutch teeth arranged to positively engage the clutch teeth of the washer, said clutch teeth being arranged on the inner face of the nut, said arm being formed of malleable material and adapted to be bent into a transverse position over the nut and forced into the split end of the bolt.

In testimony whereof I have hereunto set my hand in presence of two subscribing witnesses.

ALVIS JACKSON HATHCOX.

Witnesses:
L. C. BARRON,
B. M. HEAD.